US012737563B2

(12) United States Patent
Kumar et al.

(10) Patent No.: US 12,737,563 B2
(45) Date of Patent: Sep. 15, 2026

(54) REGIONAL SIGN LANGUAGE TRANSLATION

(71) Applicant: Dell Products L.P., Round Rock, TX (US)

(72) Inventors: Dhilip Kumar, Bangalore (IN); Ajay Maikhuri, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 248 days.

(21) Appl. No.: 18/189,308

(22) Filed: Mar. 24, 2023

(65) Prior Publication Data

US 2024/0320449 A1 Sep. 26, 2024

(51) Int. Cl.
*G06F 40/58* (2020.01)
*G06V 20/40* (2022.01)
(Continued)

(52) U.S. Cl.
CPC .............. *G06F 40/58* (2020.01); *G06V 20/41* (2022.01); *G06V 40/28* (2022.01); *H04L 65/1083* (2013.01)

(58) Field of Classification Search
CPC ........ G06F 40/58; G06V 20/41; G06V 40/28; H04L 65/1083
See application file for complete search history.

(56) References Cited

U.S. PATENT DOCUMENTS 10,289,903 B1 * 5/2019 Chandler ............... G06N 20/00
2013/0226553 A1 * 8/2013 Ji ............................ G06F 40/44 704/2

(Continued)

FOREIGN PATENT DOCUMENTS

CN 109214347 A * 1/2019 ............ G06F 40/58
TW I795209 B * 3/2023

OTHER PUBLICATIONS

Paul et al., How to Choose the Best Pivot Language for Automatic Translation of Low-Resource Languages, 2013, ACM Transactions on Asian Language Processing, vol. 12, No. 4, Article 14 (Year: 2013).*

(Continued)

*Primary Examiner* — Pierre Louis Desir
*Assistant Examiner* — Cody Douglas Hutcheson
(74) *Attorney, Agent, or Firm* — DALY, CROWLEY, MOFFORD & DURKEE, LLP

(57) ABSTRACT

An example methodology implementing the disclosed techniques includes, by a computing device, receiving a first video stream captured by a camera, analyzing images within the first video stream to recognize a first regional sign language, and determining a caption that portrays a meaning conveyed by the recognized first regional sign language. The method also includes, by the computing device, translating the first caption to a neutral language to generate a neutral language caption, translating the neutral language caption to generate a regional language caption, the regional language associated with an intended recipient of the first video stream, and generating a second video stream composed of a second regional sign language images representing the regional language caption. The method may also include sending the second video stream to the intended recipient of the first video stream. The first video stream may be received during a sign language conversation session.

20 Claims, 7 Drawing Sheets

(51) Int. Cl.
*G06V 40/20* (2022.01)
*H04L 65/1083* (2022.01)

(56) References Cited

U.S. PATENT DOCUMENTS

| | | | | |
|---|---|---|---|---|
| 2020/0126584 | A1* | 4/2020 | Huang | G10L 21/10 |
| 2022/0139417 | A1* | 5/2022 | Maxwell | H04N 7/15 704/235 |
| 2023/0230415 | A1* | 7/2023 | Mahyari | G06V 40/28 382/103 |
| 2023/0290371 | A1* | 9/2023 | Jawahar | G10L 25/30 |

OTHER PUBLICATIONS

Kishore and Kumar, A Video Based Indian Sign Language Recognition System (INSLR) Using Wavelet Transform and Fuzzy Logic, 2012, IACSIT International Journal of Engineering and Technology, vol. 4, No. 5, 6 pages (Year: 2012).*

Adeyanju et al., Development of an American Sign Language Recognition System using Canny Edge and Histogram of Oriented Gradient, 2022, Nigerian Journal of Technological Development, vol. 19, No. 3, 11 pages (Year: 2022).*

Stoll et al., Text2Sign: Towards Sign Language Production Using Neural Machine Translation and Generative Adversarial Networks, Jan. 2, 2020, International Journal of Computer Vision (2020) 128:891-908 (Year: 2020).*

* cited by examiner

REGIONAL SIGN LANGUAGE TRANSLATION

BACKGROUND

Sign language (also known as "signed language") is a visual language that uses manual communication, primarily through the use of hand and body gestures and facial expressions, to convey meaning. Primarily used by people who are hearing-impaired, sign language is also used by hearing individuals, such as those unable to speak.

There are more than 300 different sign languages in the world and sign languages can vary based on region. For example, American Sign Language (ASL) is a complete, natural language that has the same linguistic properties as spoken languages, with grammar that differs from English. ASL is expressed primarily by movements of the hands and face. Japanese sign Language (JSL) is the dominant sign language in Japan and is a complete natural language, distinct from but influenced by the spoken Japanese language. Indian Sign Language (ISL) is used in the hearing-impaired community throughout India, and within India there are several different sign languages. French Sign Language (French: langue des signes française, LSF) is the sign language of the hearing-impaired in France and French-speaking parts of Switzerland.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, by a computing device, receiving a first video stream captured by a camera, analyzing images within the first video stream to recognize a first regional sign language, and determining a first caption that portrays a meaning conveyed by the recognized first regional sign language. The method also includes, by the computing device, translating the first caption to a neutral language to generate a neutral language caption, translating the neutral language caption to generate a first regional language caption, the first regional language associated with a first intended recipient of the first video stream, and generating a second video stream composed of a second regional sign language images representing the first regional language caption.

In some embodiments, the method also includes, by the computing device, sending the second video stream to the first intended recipient of the first video stream. In one aspect, sending the second video stream includes sending the second video stream to another computing device.

In some embodiments, the receiving the first video stream is during a sign language conversation session.

In some embodiments, the neutral language is American English.

In some embodiments, the first video stream is from another computing device.

In some embodiments, the regional language associated with the first intended recipient is determined from a signing of the first intended recipient.

In some embodiments, the method also includes, by the computing device, translating the neutral language caption to generate a second regional language caption, the second regional language associated with a second intended recipient of the first video stream, and generating a third video stream composed of a third regional sign language mages representing the second regional language caption.

In some embodiments, the method further includes, by the computing device, sending the third video stream to the second intended recipient of the first video stream.

According to another illustrative embodiment provided to illustrate the broader concepts described herein, a computing device includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Certain embodiments of the concepts, techniques, and structures disclosed herein generally relate to systems and methods that provide translation of sign languages from a first sign language to a second sign language to enable hearing-impaired users of the first and second sign languages to communicate. For users using different sign languages to communicate, such as hearing-impaired people from different regions, the sign language of the speaker needs to be translated to the sign language of the listener. This requires an interpreter with knowledge of both the sign language of the speaker and the sign language of the listener. For example, the interpreter sees the sign language motions (or "signing") of the speaker, translates the meaning of speaker's sign language motions to motions of the listener's sign language, and signs the meaning of the speaker's sign language motions to the listener in the listener's sign language. Without the interpreter with knowledge of both sign languages, communication between users of different sign languages is greatly compromised.

Figure 1:
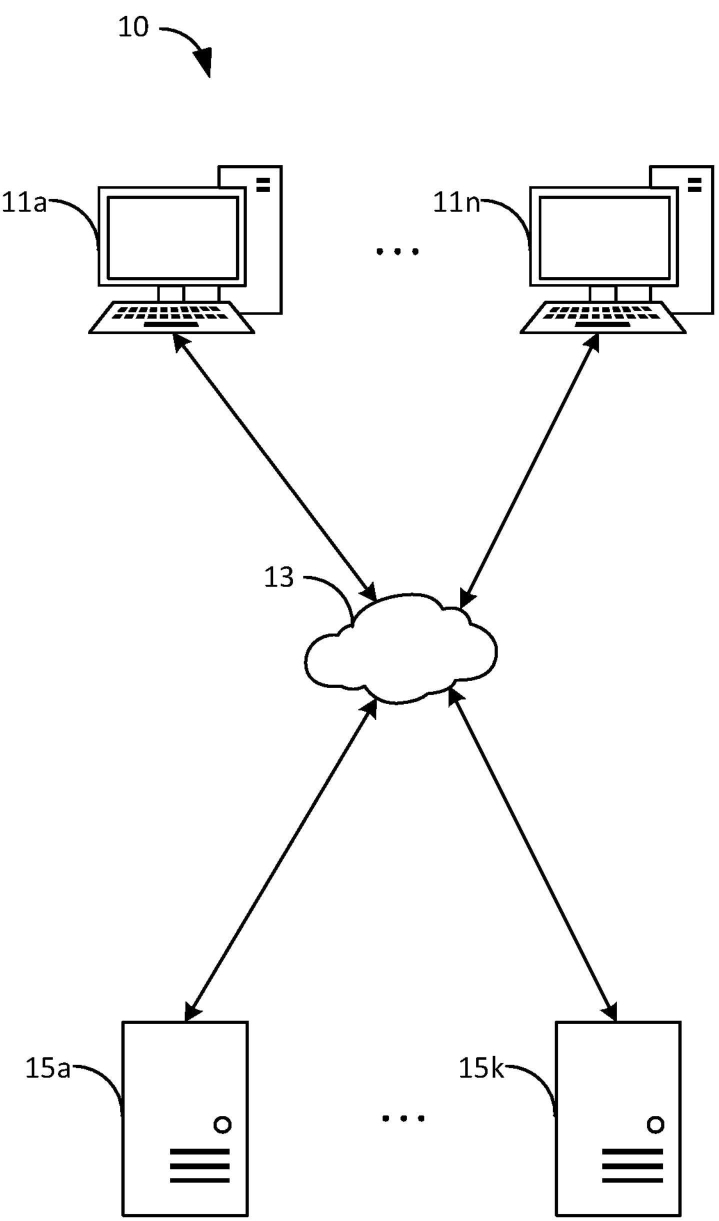
FIG. 1 is a diagram illustrating an example network environment of computing devices in which various aspects of the disclosure may be implemented, in accordance with an embodiment of the present disclosure.

Referring now to FIG. 1, shown is a diagram illustrating an example network environment 10 of computing devices in which various aspects of the disclosure may be implemented, in accordance with an embodiment of the present disclosure. As shown, environment 10 includes one or more client machines 11*a*-11*n* (11 generally), one or more server machines 15*a*-15*k* (15 generally), and one or more networks 13. Client machines 11 can communicate with server machines 15 via networks 13. Generally, in accordance with client-server principles, a client machine 11 requests, via network 13, that a server machine 15 perform a computation or other function, and server machine 15 responsively fulfills the request, optionally returning a result or status indicator in a response to client machine 11 via network 13.

In some embodiments, client machines 11 can communicate with remote machines 15 via one or more intermediary appliances (not shown). The intermediary appliances may be positioned within network 13 or between networks 13. An intermediary appliance may be referred to as a network interface or gateway. In some implementations, the intermediary appliance may operate as an application delivery controller (ADC) in a datacenter to provide client machines (e.g., client machines 11) with access to business applications and other data deployed in the datacenter. The intermediary appliance may provide client machines with access to applications and other data deployed in a cloud computing environment, or delivered as Software as a Service (SaaS) across a range of client devices, and/or provide other functionality such as load balancing, etc.

Client machines 11 may be generally referred to as computing devices 11, client devices 11, client computers 11, clients 11, client nodes 11, endpoints 11, or endpoint nodes 11. Client machines 11 can include, for example, desktop computing devices, laptop computing devices, tablet computing devices, mobile computing devices, workstations, and/or hand-held computing devices. Server machines 15 may also be generally referred to a server farm 15. In some embodiments, a client machine 11 may have the capacity to function as both a client seeking access to resources provided by server machine 15 and as a server machine 15 providing access to hosted resources for other client machines 11.

Server machine 15 may be any server type such as, for example, a file server, an application server, a web server, a proxy server, a virtualization server, a deployment server, a Secure Sockets Layer Virtual Private Network (SSL VPN) server; an active directory server; a cloud server; or a server executing an application acceleration program that provides firewall functionality, application functionality, or load balancing functionality. Server machine 15 may execute, operate, or otherwise provide one or more applications. Non-limiting examples of applications that can be provided include software, a program, executable instructions, a virtual machine, a hypervisor, a web browser, a web-based client, a client-server application, a thin-client, a streaming application, a communication application, or any other set of executable instructions.

In some embodiments, server machine 15 may execute a virtual machine providing, to a user of client machine 11, access to a computing environment. In such embodiments, client machine 11 may be a virtual machine. The virtual machine may be managed by, for example, a hypervisor, a virtual machine manager (VMM), or any other hardware virtualization technique implemented within server machine 15.

Networks 13 may be configured in any combination of wired and wireless networks. Network 13 can be one or more of a local-area network (LAN), a wide area network (WAN), a metropolitan area network (MAN), a virtual private network (VPN), a primary public network, a primary private network, the Internet, or any other type of data network. In some embodiments, at least a portion of the functionality associated with network 13 can be provided by a cellular data network and/or mobile communication network to facilitate communication among mobile devices. For short range communications within a wireless local-area network (WLAN), the protocols may include 802.11, Bluetooth, and Near Field Communication (NFC).

Figure 2:
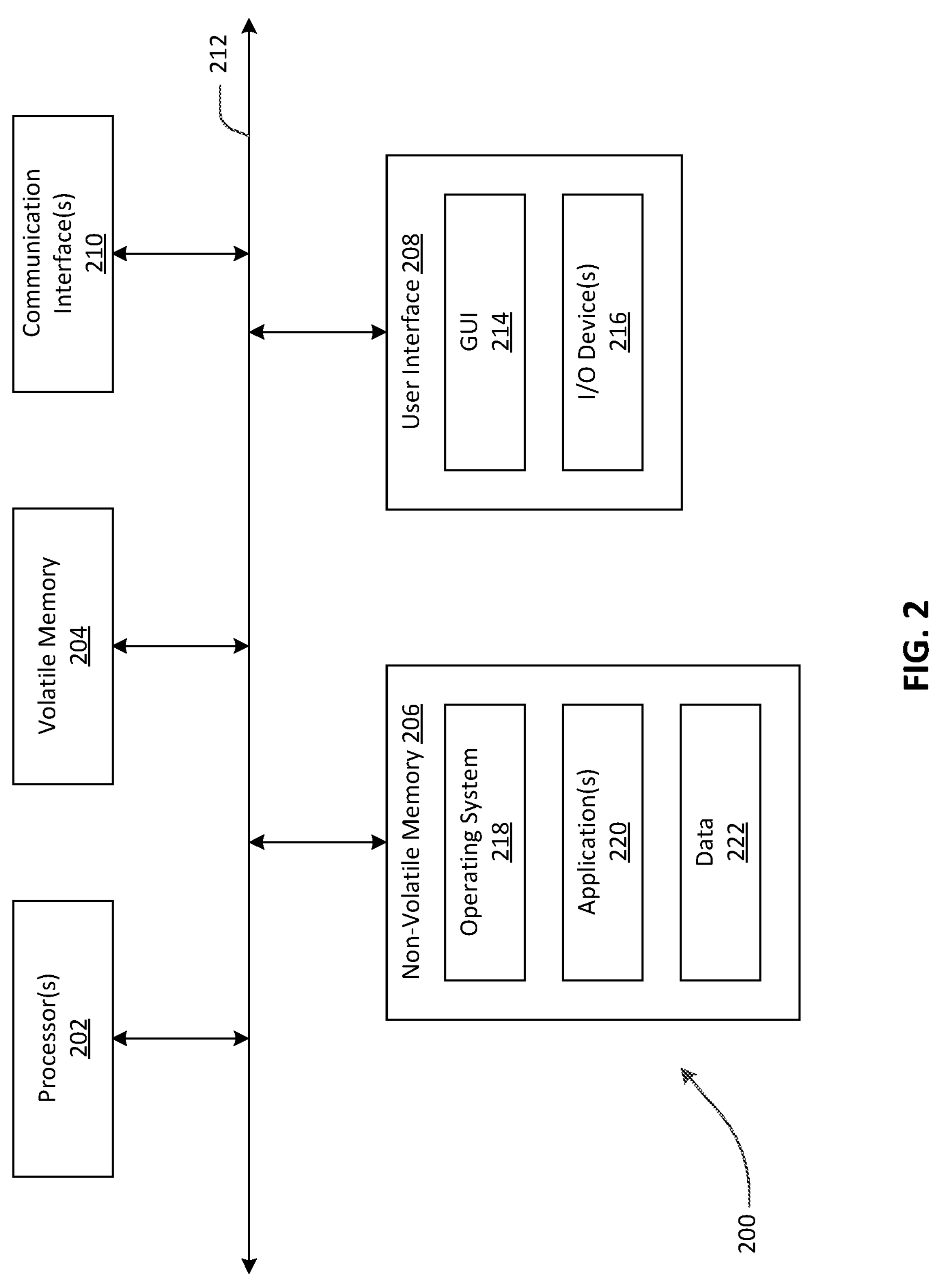
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 200 in which various aspects of the disclosure may be implemented, in accordance with an embodiment of the present disclosure. For instance, client machines 11 and/or server machines 15 of FIG. 1 can be substantially similar to computing device 200. As shown, computing device 200 includes one or more processors 202, a volatile memory 204 (e.g., random access memory (RAM)), a non-volatile memory 206, a user interface (UI) 208, one or more communications interfaces 210, and a communications bus 212.

Non-volatile memory 206 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 208 may include a graphical user interface (GUI) 214 (e.g., a touchscreen, a display, etc.) and one or more input/output (I/O) devices 216 (e.g., a mouse, a keyboard, a microphone, one or more speakers, one or more cameras, one or more biometric scanners, one or more environmental sensors, and one or more accelerometers, etc.).

Non-volatile memory 206 stores an operating system 218, one or more applications 220, and data 222 such that, for example, computer instructions of operating system 218 and/or applications 220 are executed by processor(s) 202 out of volatile memory 204. In one example, computer instructions of operating system 218 and/or applications 220 are executed by processor(s) 202 out of volatile memory 204 to perform all or part of the processes described herein (e.g., processes illustrated and described with reference to FIGS.

4 through 7). In some embodiments, volatile memory 204 may include one or more types of RAM and/or a cache memory that may offer a faster response time than a main memory. Data may be entered using an input device of GUI 214 or received from I/O device(s) 216. Various elements of computing device 200 may communicate via communications bus 212.

The illustrated computing device 200 is shown merely as an illustrative client device or server and may be implemented by any computing or processing environment with any type of machine or set of machines that may have suitable hardware and/or software capable of operating as described herein.

Processor(s) 202 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 202 may be analog, digital or mixed signal. In some embodiments, processor 202 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 210 may include one or more interfaces to enable computing device 200 to access a computer network such as a Local Area Network (LAN), a Wide Area Network (WAN), a Personal Area Network (PAN), or the Internet through a variety of wired and/or wireless connections, including cellular connections.

In described embodiments, computing device 200 may execute an application on behalf of a user of a client device. For example, computing device 200 may execute one or more virtual machines managed by a hypervisor. Each virtual machine may provide an execution session within which applications execute on behalf of a user or a client device, such as a hosted desktop session. Computing device 200 may also execute a terminal services session to provide a hosted desktop environment. Computing device 200 may provide access to a remote computing environment including one or more applications, one or more desktop applications, and one or more desktop sessions in which one or more applications may execute.

Figure 3:
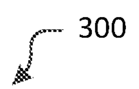
FIG. 3 is a diagram of a cloud computing environment in which various aspects of the concepts described herein may be implemented.
Figure 3:
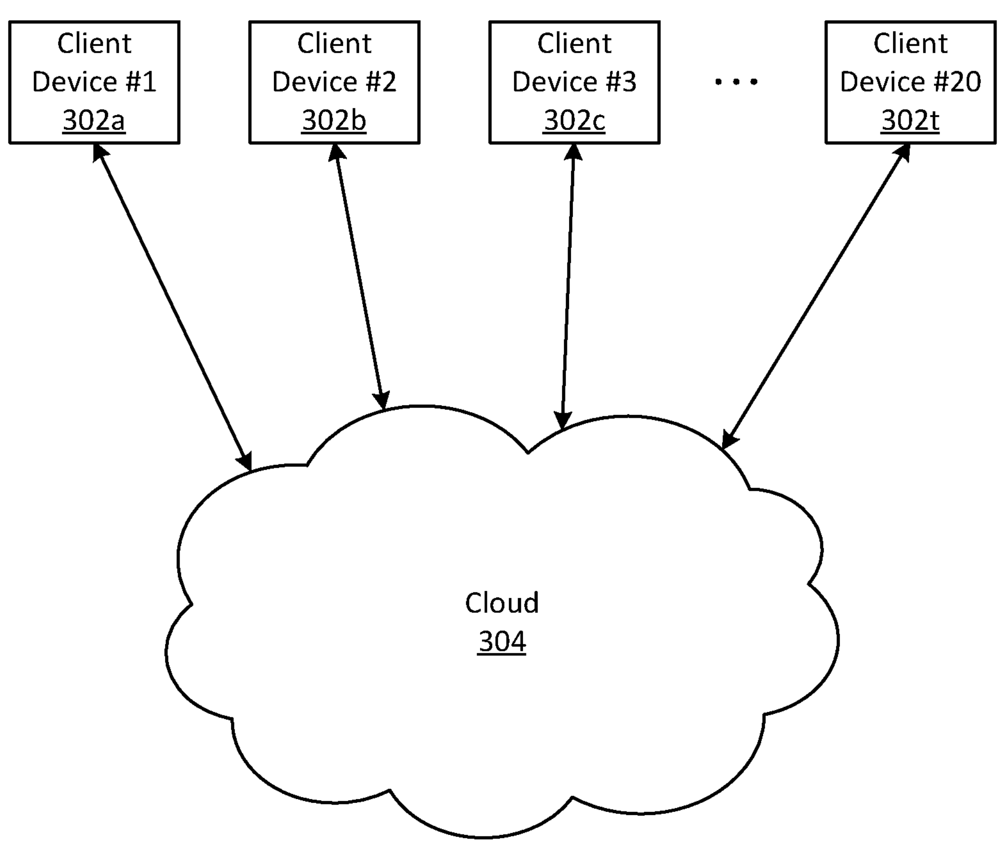

Referring to FIG. 3, shown is a diagram of a cloud computing environment 300 in which various aspects of the concepts described herein may be implemented. Cloud computing environment 300, which may also be referred to as a cloud environment, cloud computing, or cloud network, can provide the delivery of shared computing resources and/or services to one or more users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more client devices 302*a*-302*t* (such as client machines 11 and/or computing device 200 described above) may be in communication with a cloud network 304 (sometimes referred to herein more simply as a cloud 304). Cloud 304 may include back-end platforms such as, for example, servers, storage, server farms, or data centers. The users of clients 302*a*-302*t* can correspond to a single organization/tenant or multiple organizations/tenants. More particularly, in one implementation, cloud computing environment 300 may provide a private cloud serving a single organization (e.g., enterprise cloud). In other implementations, cloud computing environment 300 may provide a community or public cloud serving one or more organizations/tenants.

In some embodiments, one or more gateway appliances and/or services may be utilized to provide access to cloud computing resources and virtual sessions. For example, a gateway, implemented in hardware and/or software, may be deployed (e.g., reside) on-premises or on public clouds to provide users with secure access and single sign-on to virtual, SaaS, and web applications. As another example, a secure gateway may be deployed to protect users from web threats.

In some embodiments, cloud computing environment 300 may provide a hybrid cloud that is a combination of a public cloud and a private cloud. Public clouds may include public servers that are maintained by third parties to client devices 302*a*-302*t* or the enterprise/tenant. The servers may be located off-site in remote geographical locations or otherwise.

Cloud computing environment 300 can provide resource pooling to serve clients devices 302*a*-302*t* (e.g., users of client devices 302*a*-302*n*) through a multi-tenant environment or multi-tenant model with different physical and virtual resources dynamically assigned and reassigned responsive to different demands within the respective environment. The multi-tenant environment can include a system or architecture that can provide a single instance of software, an application, or a software application to serve multiple users. In some embodiments, cloud computing environment 300 can include or provide monitoring services to monitor, control, and/or generate reports corresponding to the provided shared resources and/or services.

In some embodiments, cloud computing environment 300 may provide cloud-based delivery of various types of cloud computing services, such as Software as a service (SaaS), Platform as a Service (PaaS), Infrastructure as a Service (IaaS), and/or Desktop as a Service (DaaS), for example. IaaS may refer to a user renting the use of infrastructure resources that are needed during a specified time period. IaaS providers may offer storage, networking, servers, or virtualization resources from large pools, allowing the users to quickly scale up by accessing more resources as needed. PaaS providers may offer functionality provided by IaaS, including, e.g., storage, networking, servers, or virtualization, as well as additional resources such as, for example, operating systems, middleware, and/or runtime resources. SaaS providers may offer the resources that PaaS provides, including storage, networking, servers, virtualization, operating systems, middleware, or runtime resources. SaaS providers may also offer additional resources such as, for example, data and application resources. DaaS (also known as hosted desktop services) is a form of virtual desktop service in which virtual desktop sessions are typically delivered as a cloud service along with the applications used on the virtual desktop.

Figure 4:
FIG. 4 is a diagram of an illustrative network environment in which sign language translation may be implemented, in accordance with an embodiment of the present disclosure.
Figure 4:
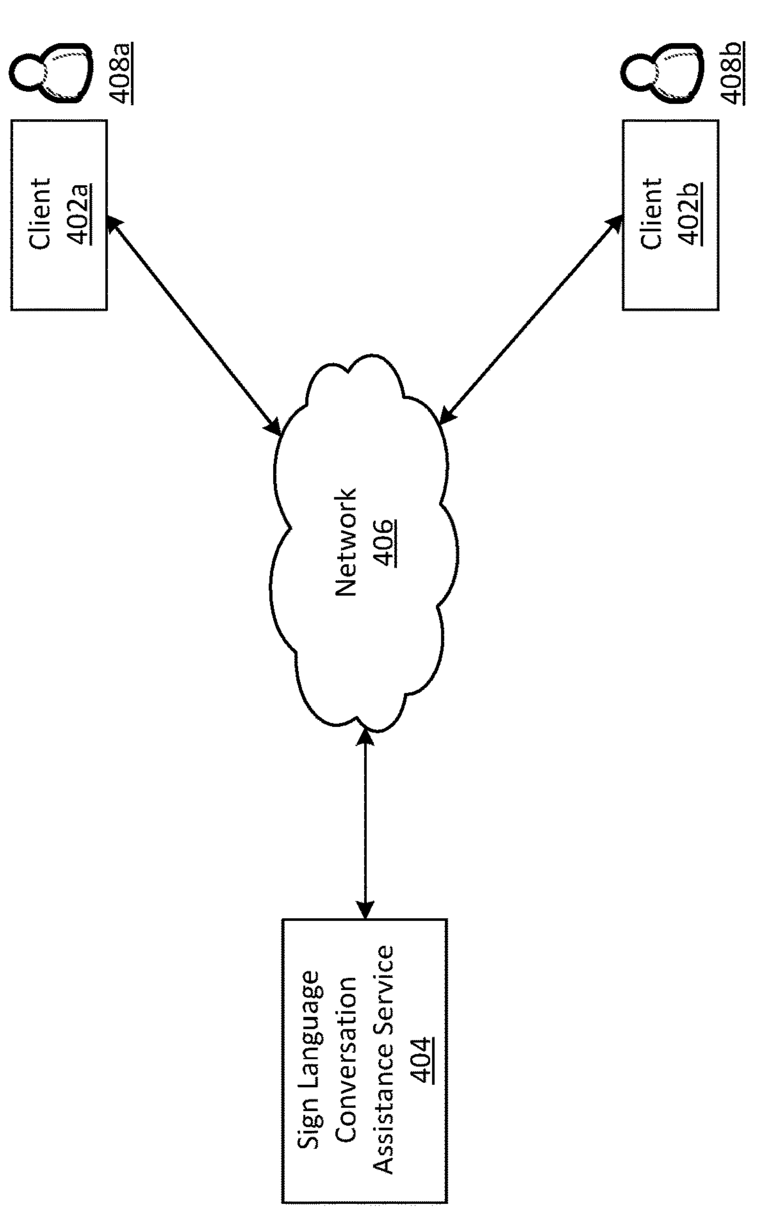

FIG. 4 is a diagram of an illustrative network environment 400 in which sign language translation may be implemented, in accordance with an embodiment of the present disclosure. As shown, illustrative network environment 400 includes clients 402*a*, 402*b*, (402 generally) and a sign language conversation assistance service 404. Client devices 402 may be configured to communicate with sign language conversation assistance service 404 via one or more computer networks 406 (e.g., via the Internet). Sign language conversation assistance service 404 may be provided as part of a cloud computing environment (e.g., cloud computing environment 300 of FIG. 3).

Clients 402*a*, 402*b*, may be used by or otherwise associated with users 408*a*, 408*b*, (408 generally), respectively. Users 408 may correspond to participants in a sign language conversation session (sometimes referred to herein more simply as a "signing conversation") facilitated (enabled) by sign language conversation assistance service 404. Clients 402 can include, for example, desktop computing devices, laptop computing devices, tablet computing devices, and/or mobile computing devices. Clients 402 can be configured to run one or more applications, such as desktop applications, mobile applications, and SaaS applications. Among various other types of applications, clients 402 can run a video communication application that provides video communication functionality. The video communication application running on client 402 can communicate with sign language conversation assistance service 404 and/or with the video communication applications running on other clients 402 (e.g., using peer-to-peer communication). In some embodiments, a client 402 may be the same or substantially similar to client 11 described above in the context of FIG. 1 and/or computing device 200 described above in the context of FIG. 2. While only two clients 402 and two corresponding users 408*a*, 408*b*, are shown in FIG. 4, the structures and techniques sought to be protected herein can be applied to any number of users and clients.

In the example of FIG. 4, users 408 may use respective clients 402 to participate in a signing conversation with one another. User 408*a* may be signing in a first regional sign language (e.g., ISL) and user 408*b* may signing in a second regional sign language (e.g., JSL) that is different than the sign language being used by user 408*a*. During the signing conversation, the video communication application on client 402*a* may receive a video stream captured by a camera connected to or otherwise associated with client 402*a*. The video stream may include a sequence of images ("frames") whose content show the signing of user 408*a* in the first regional sign language. Client 402*a* may transmit or otherwise send the video stream showing the signing in the first regional sign language to sign language conversation assistance service 404 via network 406.

Sign language conversation assistance service 404 may provide sign language translation functionality to enable signing conversations to occur between signing participants at various regions using different regional sign languages. In addition to functionality provided by existing video communication services/applications, in response to receiving the video stream from client 402*a*, sign language conversation assistance service 404 can analyze the images within the video stream to recognize the first regional sign language (e.g., ISL). Sign language conversation assistance service 404 can determine a caption that portrays the recognized first regional sign language. The caption may be in the same language as the recognized first regional sign language. For example, if the recognized regional sign language is ISL, the caption may be in Hindi (the text of the caption may be in Hindi). As another example, if the recognized regional sign language is JSL, the caption may be in Katakana (the text of the caption may be in Katakana). Sign language conversation assistance service 404 can then translate the language of the caption to a neutral language, such as, for example, American English, to generate a neutral language caption (e.g., generate a neutral language caption that portrays the meaning conveyed by the recognized first regional sign language). Sign language conversation assistance service 404 can then translate the neutral language caption to a language of user 408*b*. That is, the neutral language caption can be translated to a caption in the language that is understood user 408*b*. In some embodiments, sign language conversation assistance service 404 can determine the language of the participants in a signing conversation based on the signing made by the respective participants. For example, sign language conversation assistance service 404 can determine that the language of user 408*a* is Hindi from the ISL images in the video stream received from client 402*a*. Similarly, sign language conversation assistance service 404 can determine that the language of user 408*b* is Katakana from the JSL images in the video stream received from client 402*b*.

Upon translating the caption to the language of user 408*b*, sign language conversation assistance service 404 can generate another video stream composed of images of a regional sign language representing the translated caption in the language of user 408*b* (e.g., another video stream composed of regional sign language images representing the caption translated to the language of user 408*b*). For example, sign language conversation assistance service 404 can generate another video stream composed of the second regional sign language (e.g., JSL) images representing the translated caption. Sign language conversation assistance service 404 can then send the other video stream to client 402*b* for display. In response to client 402*b* receiving the other video stream, the video communication application on client device 402*b* may display the images within the other video stream on a user interface (UI) of the video communication application. As a result, the sign language conversation participant at client 402*b*, e.g., user 408*b*, can view the signing mage by user 408*a* using the first regional sign language (e.g., ISL) translated to the second regional sign language (e.g., JSL). User 408*b* is thus able to understand the signing of user 408*a* using the first regional sign language.

Figure 5:
FIG. 5 is a block diagram of an illustrative system for sign language translation, in accordance with an embodiment of the present disclosure.
Figure 5:
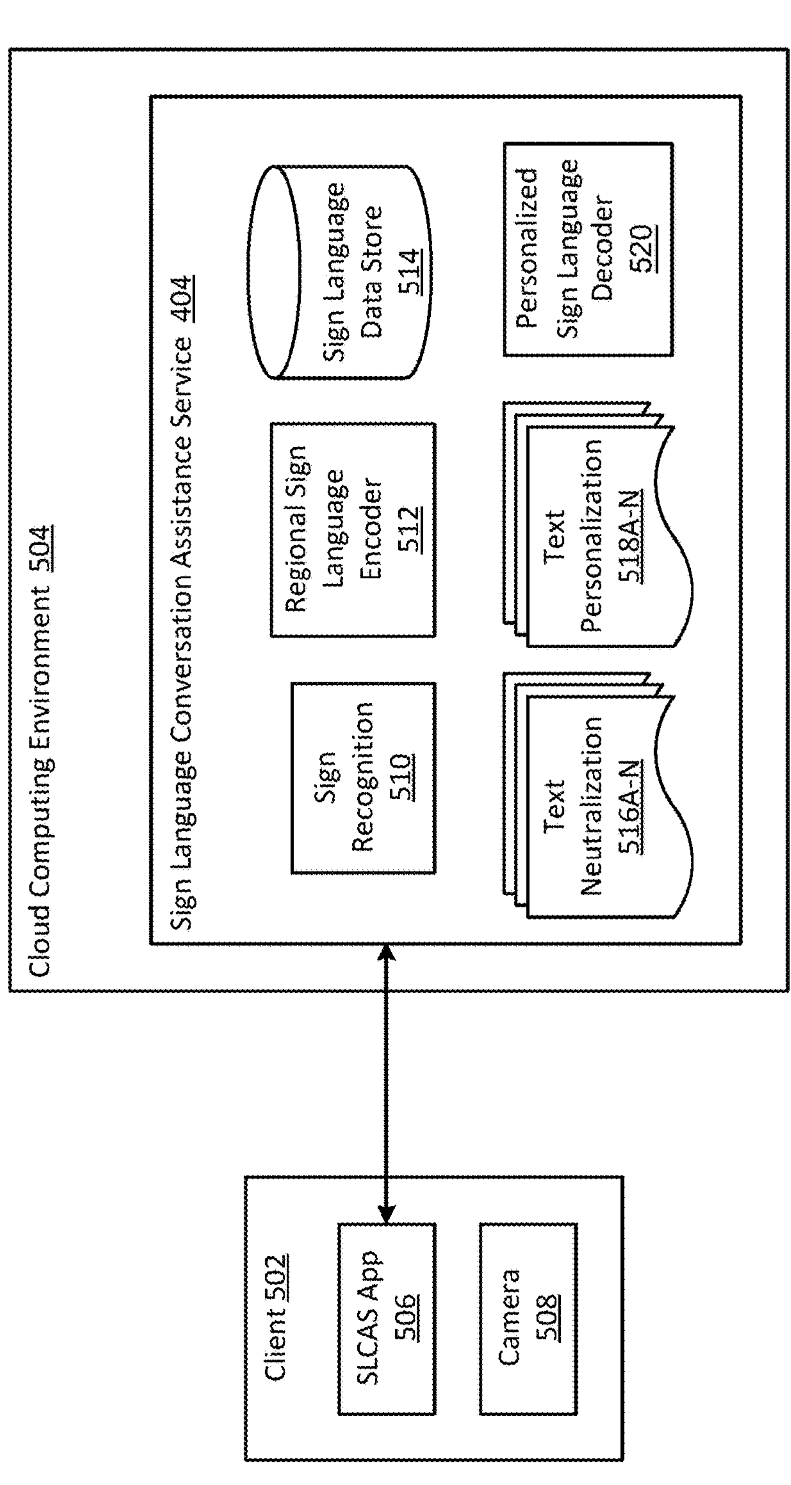

Turning to FIG. 5 and with continued reference to FIG. 4, shown is a block diagram of an illustrative system 500 for sign language translation, in accordance with an embodiment of the present disclosure. Illustrative system 500 includes a client 502 communicably coupled to sign language conversation assistance service 404 provided within a cloud computing environment 504. Client 502 can correspond to any or all of clients 402 of FIG. 4. Cloud computing environment 504 can be the same or similar to cloud computing environment 300 of FIG. 3.

Illustrative client 502 can include a sign language conversation assistance service (SLCAS) application 506 among various other applications. SLCAS application 506 may correspond to a client application that can provide video communication among other features. SLCAS application 506 may connect to sign language conversation assistance service 404 via one or more computer networks (e.g., network 406) to allow a user (e.g., user 408) to participate in signing conversations facilitated thereby.

As shown in FIG. 5, sign language conversation assistance service 404 can be provided as a service (e.g., a microservice) within cloud computing environment 504. SLCAS application 506 and sign language conversation assistance service 404 can interoperate to provide sign language translation to a user of SLCAS application 506, as variously disclosed herein. To promote clarity in the drawings, FIG. 5 shows a single SLCAS application 506 communicably coupled to sign language conversation assistance service 404. However, embodiments of sign language conversation assistance service 404 can be used to service many SLCAS applications 506 used by many different users located at many different locations and/or regions. Sign language conversation assistance service 404 may be implemented as computer instructions executable to perform the corresponding functions disclosed herein. In the example of FIG. 5, sign language conversation assistance service 404 includes a sign recognition module 510, a regional sign language encoder module 512, a sign language data store 514, text neutralization models 516A-N, text personalization models 518A-N, and a personalized sign language decoder module 520.

The client-side SLCAS application 506 can communicate with cloud-side sign language conversation assistance service 404 using an API. For example, SLCAS application 506 can send API requests (or "messages") or other communications to sign language conversation assistance service 404 wherein the messages/communications are received and processed by sign language conversation assistance service 404 or a component of sign language conversation assistance service 404. Likewise, sign language conversation assistance service 404 or a component of sign language conversation assistance service 404 can send API messages/communications (e.g., responses) to SLCAS application 506 wherein the messages/communications are received and processed by SLCAS application 506 or a component of SLCAS application 506.

Referring again to representative client 502, SLCAS application 506 can include various UI controls that enable a user (e.g., user of client 502) to participate in a signing conversation facilitated by sign language conversation assistance service 404. For example, the UI controls can include elements/controls, such as a list box or a text box, provided on a UI or window of SLCAS application 506 that a user can use to select and/or enter (e.g., specify) one or more other participants in a signing conversation. The UI controls can also include elements/controls that a user can click/tap to join a signing conversation with the other specified participants. In response to the user's input, SLCAS application 506 on client 502 can send a message to sign language conversation assistance service 404 requesting to join the specified signing conversation. Once joined to the signing conversation, the user can participate in the signing conversation with the other participants. Client 502 can include or otherwise have access to a camera 508 (e.g., a video camera or webcam) which can be used to capture a video stream including images whose content show the user's signing during the signing conversation. The video stream including the images showing the user's signing can be sent (e.g., transmitted) to sign language conversation assistance service 404. During the signing conversation, client 502 may also receive a video stream from sign language conversation assistance service 404. The video stream from sign language conversation assistance service 404 can include images whose content show the signing of the other participants in the signing conversation translated to the sign language of the user of client 502. SLCAS application 506 on client 502 can display the received video stream, for example, on a display connected to or otherwise associated with client 502.

In the embodiment of FIG. 5, SLCAS application 506 is shown as a stand-alone client application. In other embodiments, SLCAS application 506 may be implemented as a plug-in or extension to another application (e.g., a web browser) on client 402, such as, for example, a conferencing or meeting application.

Referring to sign language conversation assistance service 404, sign recognition module 510 is operable to reduce (and ideally eliminate) noise from the images within a video stream. In some embodiments, in response to sign language conversation assistance service 404 receiving a video stream including sign language content (e.g., regional sign language images) from an SLCAS application (e.g., SLCAS application 506 on client 502), sign recognition module 510 can be used to perform noise reduction on the individual images within the video stream. The noise reduction on an image may eliminate content (e.g., artifacts) other than the sign language content from the image thus making the sign language (i.e., the signing) recognizable in the image.

In some embodiments, for a particular image within a video stream, sign recognition module 510 may apply a thresholding technique, such as Otsu's segmentation algorithm, to generate a de-noised image. In brief, Otsu's segmentation algorithm is a clustering-based image segmentation (thresholding) process of separating the foreground pixels from the background pixels. Otsu's segmentation algorithm returns a single intensity threshold that separates pixels into two classes, foreground and background. This threshold is determined by minimizing intra-class intensity variance, defined as a weighted sum of variances of the two classes (background and foreground). The colors in grayscale are usually between 0 to 255, inclusively.

The formula for finding the within-class variance at any threshold t is given by the following:

$$\sigma_\omega^2(t) = \omega_1(t)\sigma_1^2(t) + \omega_2(t)\sigma_2^2(t),$$

where $\omega_1(t)$ and $\omega_2(t)$ represents are the probabilities of the two classes separated by a threshold t, and $$\sigma_1^2 \text{ and } \sigma_2^2$$

represent the variances of the two classes (i.e., variances of the color values). The value of threshold t can be within the range from 0 to 255, inclusive, which are usually the colors in grayscale. By way of example, assuming a threshold t of N (e.g., N=30, 40, 50, or any suitable value for noise reduction), all the pixels with values less than N in an image becomes the background and all the pixels with values greater than or equal to N becomes the foreground of the image. The pixels in the image are distributed into white regions where saturation is greater than or equal to the defined threshold t and black regions where saturation is less than the threshold t. An edge detection technique, such as the Canny edge detection algorithm, can then be utilized to detect and remove the background regions (e.g., detect and remove the black regions) which are associated with the noise from the image while maintaining the foreground regions, thus generating a de-noised image.

Regional sign language encoder module 512 is operable to analyze a video stream to recognize any sign language content appearing within the video stream and to determine a caption (e.g., a text caption) that portrays a meaning conveyed by the sign language content. Regional sign language encoder module 512 can process the video stream including the de-noised images generated by sign recognition module 510 to recognize the sign language content in the de-noised images within the video stream. In some embodiments, regional sign language encoder module 512 can analyze individual de-noised images or groups of de-noised images within the video stream to detect the presence and position of any sign language content appearing therein (e.g., the position of hand and body gestures and facial expressions of the sign language appearing in the video stream). The location (position) of the sign language content appearing within an image may be expressed using points of a coordinate system (e.g., x and y coordinates) that define an outline of the sign language content, such as points defining a rectangle (bounding rectangle) or other type of polygon.

Regional sign language encoder module 512 can then determine a caption that portrays the meaning conveyed by the sign language content appearing in the de-noised images within the video stream. For example, in some implementations, regional sign language encoder module 512 can utilize a corpus of regional sign language images and corresponding text captions to recognize the sign language content in the images and determine the captions that portray the meanings conveyed by the recognized sign language content.

Figure 6:
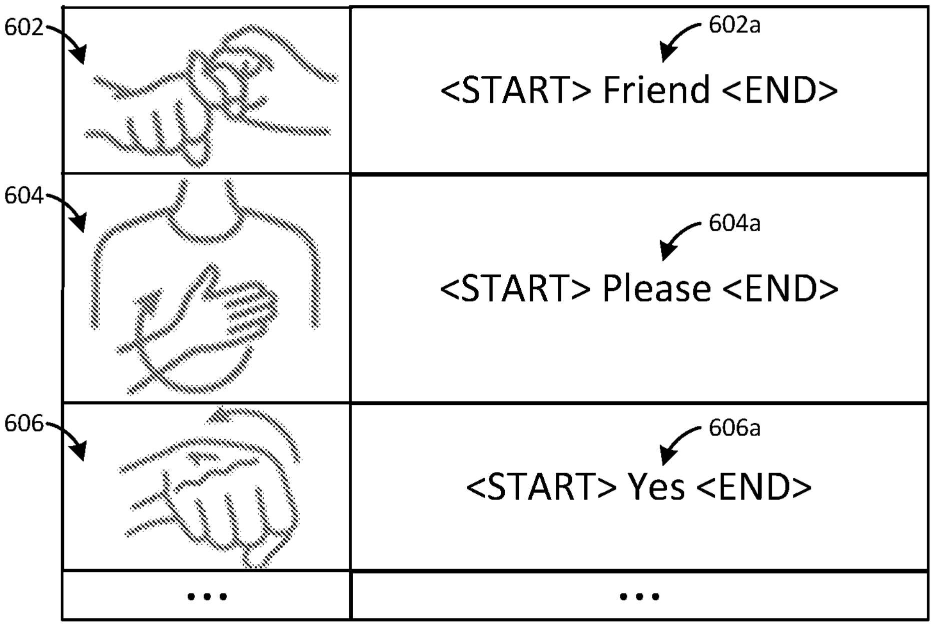
FIG. 6 shows a simplified example of a portion of a training dataset for a machine learning (ML) model, in accordance with an embodiment of the present disclosure.

A simplified example of several regional sign language images and corresponding text captions is shown in FIG. 6. In some embodiments, the regional sign language images and corresponding text captions of FIG. 6 may comprise a portion of a training dataset for a machine learning (ML) model. The example of FIG. 6 shows ASL images and corresponding captions which portray the meanings conveyed by the ASL images. The captions corresponding the images can be understood as labels which portray the meanings conveyed by the sign language content appearing in the images. For example, as can be seen in FIG. 6, an image 602 may show the hand gesture to convey the meaning "Friend" in ASL. An image 604 may show the hand gesture to convey the meaning "Please" in ASL. An image 606 may show the hand gesture to convey the meaning "Yes" in ASL. As shown in FIG. 6, respective captions 602*a*, 604*a*, 606*a* portraying the meaning conveyed by images 602, 604, 606 is the text appearing between the "<Start>" and "<End>" tokens.

The number of ASL images shown in FIG. 6 is merely illustrative and it should be appreciated that the corpus of regional sign language images and corresponding text captions generally contains a much larger number of the approximately 10,000 different ASL signs. Also, while only ASL images are shown in FIG. 6 for purposes of clarity, it will be appreciated that the corpus of regional sign language images and corresponding text captions can include images of other regional sign languages (e.g., JSL, ISL, LSF, British, Australian and New Zealand Sign Language (BANZSL), Chinese Sign Language (CSL), Spanish Sign Language (LSE), among others) and corresponding text captions that are in the regional language (e.g., text captions that are in the same language as the corresponding sign language). The corpus of regional sign language images and corresponding regional text captions can be stored (e.g., recorded) within sign language data store 514, where it can subsequently be retrieved and used.

Referring again to FIG. 5, in some embodiments, regional sign language encoder module 512 may utilize machine learning (ML)-based object detection techniques to recognize (or "detect") sign language content appearing within the video stream and to determine (or "ascertain") captions that portray the sign language content. For example, regional sign language encoder module 512 may utilize a convolutional neural network (CNN) trained by a corpus of regional sign language images and corresponding text captions in the same regional language as the sign language images to detect appearances of sign language content in the images within the video stream.

A CNN (also known as "ConvNet") is a class of deep neural networks, commonly applied to analyze visual imagery (e.g., image recognition). A CNN is typically composed of a convolution layer, a pooling layer, and a fully connected layer. The convolutional layer is the first layer and the fully connected layer is the last layer. The convolution layer in conjunction with the pooling layer are configured to perform feature extraction and the fully connected layer is configured to perform classification. In more detail, the convolution layer receives as input an image (e.g., an image within the video stream). Within the convolutional layer, a filter moves across the receptive fields of the image, checking if a feature is present in the image. One or more additional convolutional layers can follow the initial convolutional layer. The filters increase in complexity at each successive convolutional layer to check and identify features that uniquely represent the input image. The output of each convolved image (the partially recognized image after each layer) is the input for the next convolutional layer. Over multiple iterations through the convolutional layers, the filters can sweep over the entire image and extract the features from the image (known as a feature map or convolved features) by doing calculations. The pooling layer progressively reduces the size of the input image to reduce the number of parameters and computation in the network (e.g., improves the efficiency of the CNN). As a result, the most relevant features can be chosen from the feature map produced by convolving the filters on the input image. The fully connected layer recognizes the image or the object the image represents.

In some embodiments, a pretrained model, such as, for example, the ResNet-50, may be utilized to create the image embeddings (e.g., create dense vector representations of the images within the video stream). ResNet-50 is a pretrained CNN that is 50 layers deep and which can classify images into 1,000 object categories such as keyboard, mouse, pencil, and many other objects. The ResNet-50 classification model can be repurposed for another related task, such as image embedding. Repurposing a pretrained model (e.g., ResNet-50) can provide higher performance even if the pretrained model is trained on a smaller dataset. For example, this can be achieved by "freezing" the weights of all the layers of the pretrained neural network (e.g., trained on image dataset A) except the penultimate layer to obtain the learned image embedding portion of the pretrained neural network. The pretrained neural network can then be trained on the corpus of regional sign language images and corresponding text captions to learn the representations on the penultimate layer. That is, the pretrained neural network learns to take an image, and represent that image as a set of numbers (e.g., a vector or matrix).

In operation, for a particular input image (e.g., de-noised image within a video stream), the trained ML model recognizes the sign language content appearing within the image and produces (outputs) a caption based on the learned behaviors (or "trends") in the training dataset used in training the ML model. As described previously, the produced caption portrays the meaning conveyed by the sign language content recognized in the image. The extractor (i.e., the feature extraction process) produces L-vectors, which are D-dimensional representations of the image regions they map to (e.g., D-dimensional representations oof corresponding parts of an image). The trained ML model outputs feature vectors that are set annotations.

In some embodiments, regional sign language encoder module 512 may utilize a long short-term memory (LSTM) model to build (generate) an appropriate caption from the feature vectors output from the trained ML model (e.g., the feature vectors output from the trained CNN or ResNet-50). LSTM is an artificial neural network that has feedback connections, i.e., capable of learning long-term dependencies between time steps of time series data and is well suited for applications in speech recognition and machine translation. The LSTM model may be trained using machine learning techniques with a training dataset composed of regional sign language images and corresponding regional language text captions (e.g., the training dataset used to train the ML model described above). In one implementation, multiplicative filters can be used to train the LSTM without encountering any exploding or vanishing gradients, allowing for more efficient training of the LSTM. The sigmoid or the hyperbolic tangent can be used as the activation to give nonlinearity. The softmax function can be used to compute a word-by-word probability distribution. At each time step, the most likely word can be selected and used as input for the following time step, until a complete phrase is generated (e.g., until a complete phrase for the caption is generated).

Text neutralization models 516A-N (516 generally) are operable to translate a caption from its regional language to a neutral language. Text neutralization models 516 can translate a caption generated by regional sign language encoder module 512 from its regional language to a neutral language, such as, for example, American English. As a result, text neutralization models 516 can generate a neutral language caption that portrays the meaning conveyed by the sign language content recognized in the images. In some embodiments, text neutralization models 516 can correspond to Seq2Seq models trained/configured to translate text from a regional language to a neutral language. For example, in the case where the neutral language is configured to be American English, text neutralization model 516A can be a Seq2Seq model trained/configured to translate (or "convert") Hindi to American English to generate an American English language caption from a Hindi language caption, text neutralization model 516B be a Seq2Seq model trained/configured to translate Katakana to American English to generate an American English language caption from a Katakana language caption, text neutralization model 516C be a Seq2Seq model trained/configured to translate Korean to American English to generate an American English language caption from a Korean language caption, text neutralization model 516D be a Seq2Seq model trained/configured to translate French to American English to generate an American English language caption from a French language caption, and so on.

A Seq2Seq model is a model that can convert sequences of text from one domain to another domain, for example, a regional language to a neutral language (or a neutral language to a regional language). The Seq2Seq model is composed of an encoder and a decoder. In one implementation, the encoder can comprise an embedding layer and an LSTM layer, and the decoder can comprise another LSTM layer and a dense layer. The encoder captures the context of the input sequence of text (e.g., words) in the form of a vector and sends it to the decoder, which produces an output sequence of words (e.g., the translated sequence of words). A sparse categorical cross entropy can be used as the loss function since the target sequence can be utilized with the loss function.

Text personalization models 518A-N (518 generally) are operable to translate a caption from its neutral language to a regional language. Text personalization models 518 can translate a caption generated by text neutralization model 516 from its neutral language to a regional language, such as, for example, Hindi, Korean, Spanish, British English, American English, and French, among others. As a result, the individual text personalization models 518 can generate a regional language caption that portrays the meaning conveyed by the sign language content recognized in the images. In some embodiments, text personalization models 518 can correspond to Seq2Seq models trained/configured to translate text from the neutral language to a regional language. For example, in the case where the neutral language is configured to be American English, text personalization model 518A can be a Seq2Seq model trained/configured to translate American English to Hindi to generate a Hindi language caption from an American English language caption, text personalization model 518B be a Seq2Seq model trained/configured to translate American English to Katakana to generate a Katakana language caption from an American English language caption, text personalization model 518C be a Seq2Seq model trained/configured to translate American English to Korean generate a Korean language caption from an American English language caption, text personalization model 518D be a Seq2Seq model trained/configured to translate American English to Italian generate an Italian language caption from an American English language caption, and so on. In some embodiments, the Seq2Seq models implemented by text personalization models 518 can be substantially similar to the Seq2Seq models implemented by text neutralization models 516.

Personalized sign language decoder module 520 is operable to generate regional sign language images. For example, personalized sign language decoder module 520 can receive as input a regional language caption generated by text personalization model 518 and determine the regional sign languages images which represent the input regional language caption. As an example, for an input French language caption, personalized sign language decoder module 520 can determine the LSF images that represent the input French language caption. As another example, for an input caption in Katakana, personalized sign language decoder module 520 can determine the JSL images that represent the input Katakana caption.

In some embodiments, personalized sign language decoder module 520 may utilize a generative adversarial text-to-image synthesis model to determine the regional sign languages images for an input regional language caption. The generative adversarial text-to-image synthesis model combines a language model, which transform the input text (e.g., the input regional language caption) to a latent representation, and a generative image model, which produces an image (e.g., a regional sign language image) conditioned on that representation. The generative adversarial text-to-image synthesis model can be trained with a training dataset composed of regional sign language images and corresponding regional language text captions (e.g., the training dataset used to train the ML model of regional sign language encoder 512 described above). In some embodiments, the generative adversarial text-to-image synthesis model can be trained to distinguish between real regional sign language images and "fake" sign language images. This can be achieved by including in the training dataset regional sign language images with corresponding regional language text captions that portray the meaning conveyed by the regional sign language, and images with arbitrary text captions (e.g., images with fake text descriptions). Once trained, the trained generative adversarial text-to-image synthesis model can, in response to input of a caption in a regional language, determine the regional sign language images that represent the input regional language caption.

In some embodiments, personalized sign language decoder module 520 can send the regional sign language images in a video stream to an intended recipient of the video stream. For example, in one embodiment, an intended recipient of the video stream may be a participant in a signing conversation session facilitated by sign language conversation assistance service 404.

In some embodiments, some or all the processing described herein for sign language conversation assistance service 404 can be implemented within SLCAS application 506. For example, sign recognition module 510, regional sign language encoder module 512, one or more of the text neutralization models 516A-N, one or more of the text personalization models 518A-N, and/or personalized sign language decoder module 520 can be implemented as sub-modules of SLCAS application 506 and configured to execute on client 502 (rather than within cloud computing environment 504).

Figure 7:
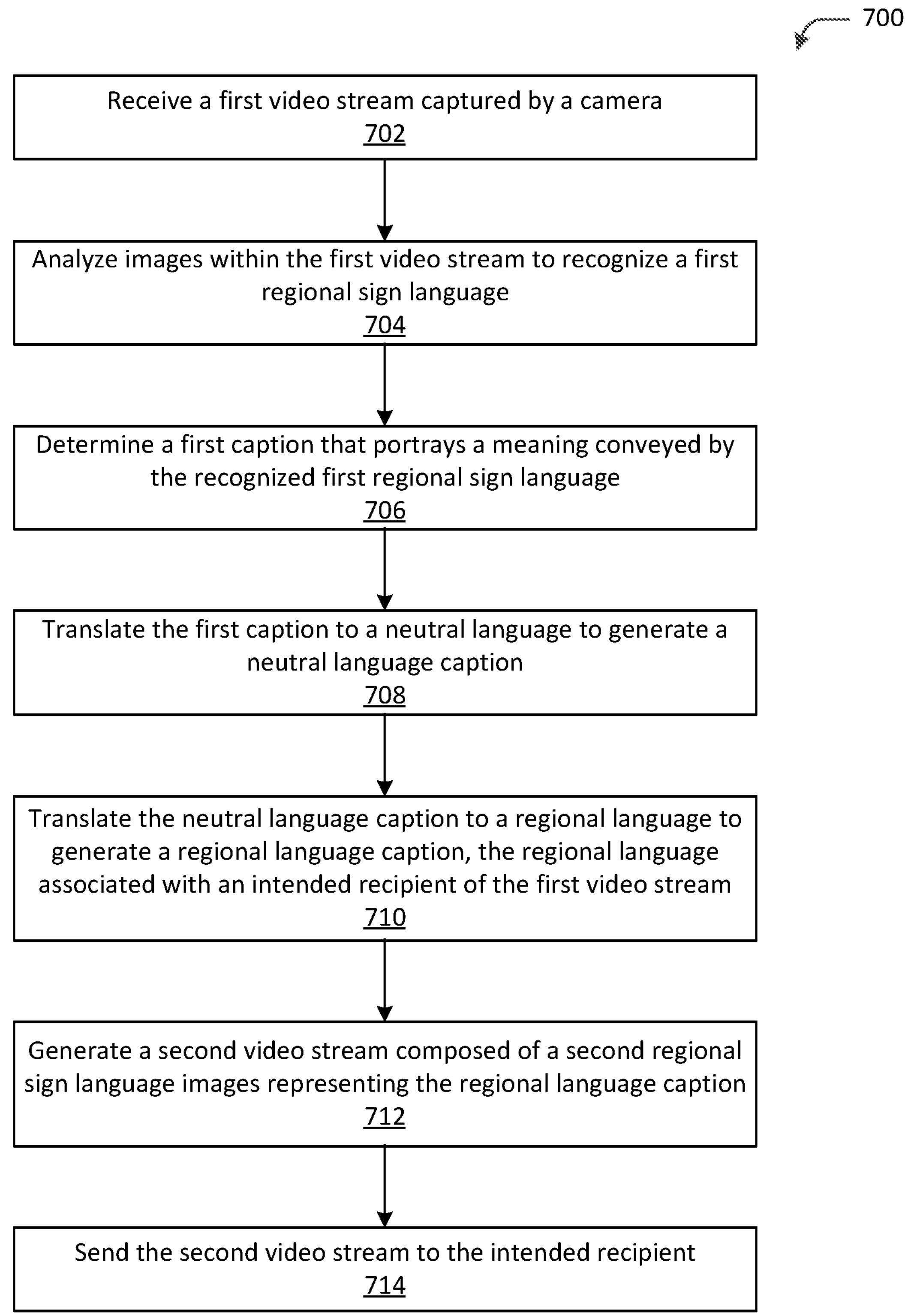
FIG. 7 is a flow diagram of an example process for sign language translation, in accordance with an embodiment of the present disclosure.

FIG. 7 is a flow diagram of an example process 700 for sign language translation, in accordance with an embodiment of the present disclosure. Illustrative process 700 may be implemented, for example, within system 500 of FIG. 5. In more detail, process 700 may be performed, for example, in whole or in part by sign recognition module 510, regional sign language encoder module 512, text neutralization models 516A-N, text personalization models 518A-N, and personalized sign language decoder module 520, or any combination of these including other components of system 500 described with respect to FIG. 5.

With reference to process 700 of FIG. 7, at 702, a first video stream captured by a camera may be received. The first video stream can be received from SLCAS application 506 on a client 502 being used by a user to participate in a signing conversation session being facilitated by sign language conversation assistance service 404. For purposes of this discussion, it is assumed that the user is in a first region (e.g., Japan) and the other participant of the signing conversation session is in a second region (e.g., France).

At 704, images within the first video stream may be analyzed to recognize a first regional sign language. For example, upon receiving the video stream, sign language conversation assistance service 404 can analyze the images within the video stream to recognize the first regional sign language (e.g., JSL). In some embodiments, sign language conversation assistance service 404 can utilize ML models to process the images and recognize the JSL content in the images within the video stream, as previously described herein.

At 706, a first caption may be determined that portrays a meaning conveyed by the recognized first regional sign language. For example, upon recognizing the JSL content in the images, sign language conversation assistance service 404 can determine a caption that portrays the meaning conveyed by the recognized sign language content. The caption may be a regional language caption that is in the same language (e.g., Katakana) as the JSL.

At 708, the first caption may be translated to a neutral language to generate a neutral language caption. For example, upon determining the regional language caption in Katakana, sign language conversation assistance service 404 can translate the Katakana to American English to generate an American English caption. That is, the Katakana text of the regional language caption can be translated to American English text to generate an American English caption. In some embodiments, sign language conversation assistance service 404 can utilize a text neutralization model 516 configured to convert Katakana to American English to translate the Katakana text of the regional language caption to American English.

At 710, the neutral language caption may be translated to a regional language to generate a regional language caption. For example, upon generating the American English caption, sign language conversation assistance service 404 can translate the American English to French, which is the region associated with the other participant in the signing conversation session, generate a French caption. That is, the American English text of the neutral language caption can be translated to French text to generate a French caption. Note that the French is the regional language of the other participant in the signing conversation session (e.g., French is the regional language of the intended recipient of the video stream received at 702). In some embodiments, sign language conversation assistance service 404 can utilize a text personalization model 518 configured to convert American English to French to translate the American English text of the neutral language caption to French. In some embodiments, sign language conversation assistance service 404 can determine the regional language of the participants in a signing conversation session based on the signing made by the respective participants.

At 712, a second video stream composed of a second regional sign language images representing the regional language caption may be generated. For example, upon generating the French caption, sign language conversation assistance service 404 can determine the LSF images that represent the French caption and generate video stream composed of the LSF images that represent the French caption. In some embodiments, sign language conversation assistance service 404 can utilize ML models to determine the regional sign language images (e.g., the LSF images) that represent the regional language caption (e.g., French caption), as previously described herein.

At 714, the second video stream may be sent to the intended recipient. For example, upon generating the video stream comprising the LSF images, sign language conversation assistance service 404 can send the video stream to the other participant of the signing conversation session in France (e.g., send the video stream to a client used by the participant in France to participate in the signing conversation). The participant in France can then view the signing of participant in Japan (i.e., the signing using JSL) translated to LSF, which is understandable by the participant in France.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:

receiving, by a computing device, a first video stream captured by a camera;

de-noising, by the computing device, images within the first video stream to reduce artifacts other than sign language content from the image;

analyzing, by the computing device, the de-noised images to recognize sign language content appearing within the first video stream using a generative adversarial text-to-image synthesis model configured to distinguish between real sign language images and fake sign language images in a first regional sign language, wherein the generative adversarial text-to-image synthesis model is trained using first training images with corresponding text captions that portray a meaning conveyed by the first training images and second training images with arbitrary non corresponding text captions, the sign language content being in the first regional sign language;

determining, by the computing device, a first caption in a first caption language that portrays a meaning conveyed by the content in the first regional sign language, wherein the first caption language is associated with the first regional sign language;

translating, by the computing device, the first caption from the first caption language to a neutral language to generate a neutral language caption;

translating, by the computing device, the neutral language caption to generate a first regional language caption in a first regional language, the first regional language associated with a first intended recipient of the first video stream, the first regional language being different from the neutral language; and generating, by the computing device, a second video stream composed of second regional sign language images representing the first regional language caption.

2. The method of claim 1, further comprising, by the computing device, sending the second video stream to the first intended recipient of the first video stream.

3. The method of claim 2, wherein sending the second video stream includes sending the second video stream to another computing device.

4. The method of claim 1, wherein the receiving the first video stream is during a sign language conversation session.

5. The method of claim 1, wherein the neutral language is American English.

6. The method of claim 1, wherein the first video stream is from another computing device.

7. The method of claim 1, wherein the first regional language associated with the first intended recipient is determined from a signing of the first intended recipient.

8. The method of claim 1, further comprising:

translating, by the computing device, the neutral language caption to generate a second regional language caption, second regional language associated with a second intended recipient of the first video stream; and generating, by the computing device, a third video stream composed of third regional sign language images representing the second regional language caption.

9. The method of claim 8, further comprising, by the computing device, sending the third video stream to the second intended recipient of the first video stream.

10. A computing device comprising:

one or more non-transitory machine-readable mediums configured to store instructions; and one or more processors configured to execute the instructions stored on the one or more non-transitory machine-readable mediums, wherein execution of the instructions causes the one or more processors to carry out a process comprising:

receiving a first video stream captured by a camera;

analyzing images within the first video stream to reduce noise comprising artifacts other than content in a first regional sign language from the images using a generative adversarial text-to-image synthesis model configured to distinguish between real sign language images and fake sign language images in the first regional sign language, wherein the generative adversarial text-to-image synthesis model is trained using first training images with corresponding text captions that portray a meaning conveyed by the first training images and second training images with arbitrary non-corresponding text captions;

determining a first caption in a first caption language that portrays a meaning conveyed by the content in the first regional sign language, wherein the first caption language is associated with the first regional sign language;

translating the first caption from the first caption language to a neutral language to generate a neutral language caption in a first regional language;

translating the neutral language caption to generate a first regional language caption in the first regional language, the first regional language associated with a first intended recipient of the first video stream, the first regional language being different from the neutral language; and generating a second video stream composed of second regional sign language images representing the first regional language caption.

11. The computing device of claim 10, wherein the process further comprises sending the second video stream to the first intended recipient of the first video stream.

12. The computing device of claim 11, wherein sending the second video stream includes sending the second video stream to another computing device.

13. The computing device of claim 10, wherein the receiving the first video stream is during a sign language conversation session.

14. The computing device of claim 10, wherein the neutral language is American English.

15. The computing device of claim 10, wherein the first video stream is from another computing device.

16. The computing device of claim 10, wherein the first regional language associated with the first intended recipient is determined from a signing of the first intended recipient.

17. The computing device of claim 10, wherein the process further comprises:

translating the neutral language caption to generate a second regional language caption, second regional language associated with a second intended recipient of the first video stream;

generating a third video stream composed of third regional sign language images representing the second regional language caption; and sending the third video stream to the second intended recipient of the first video stream.

18. A non-transitory machine-readable medium encoding instructions that when executed by one or more processors cause a process to be carried out, the process including:

receiving a first video stream captured by a camera;

analyzing images within the first video stream to reduce noise comprising artifacts other than content in a first regional sign language from the images using a generative adversarial text-to-image synthesis model configured to distinguish between real sign language images and fake sign language images in the first regional sign language, wherein the generative adversarial text-to-image synthesis model is trained using first training images with corresponding text captions that portray a meaning conveyed by the first training images and second training images with arbitrary non-corresponding text captions;

determining a caption in a first caption language that portrays a meaning conveyed by the content in the first regional sign language, wherein the first caption language is associated with the first regional sign language;

translating the caption from the first caption language to a neutral language to generate a neutral language caption;

translating the neutral language caption to generate a regional language caption in a regional language, the regional language associated with an intended recipient of the first video stream, the regional language being different from the neutral language; and generating a second video stream composed of second regional sign language images representing the regional language caption.

19. The machine-readable medium of claim 18, wherein the process further comprises sending the second video stream to the intended recipient of the first video stream.

20. The machine-readable medium of claim 18, wherein the receiving the first video stream is during a sign language conversation session.

* * * * *